United States Patent [19]

Pfeifer

[11] Patent Number: 5,781,337
[45] Date of Patent: Jul. 14, 1998

[54] OBJECT HOLDER FOR THIN SLIDES

[75] Inventor: Gerhard Pfeifer, Solms, Germany

[73] Assignee: Leica Mikroskopie und Systeme GmbH, Wetzler, Germany

[21] Appl. No.: 793,804

[22] PCT Filed: Jul. 29, 1996

[86] PCT No.: PCT/DE96/01404

§ 371 Date: Mar. 20, 1997

§ 102(e) Date: Mar. 20, 1997

[87] PCT Pub. No.: WO97/05516

PCT Pub. Date: Feb. 13, 1997

[30] Foreign Application Priority Data

Jul. 31, 1995 [DE] Germany .......... 195 27 722.8

[51] Int. Cl.[6] .......... G02B 21/26; G01N 33/52
[52] U.S. Cl. .......... 359/391; 359/393; 422/58
[58] Field of Search .......... 359/368, 369, 359/391–398; 356/3, 6, 244; 422/99–104, 55–61

[56] References Cited

U.S. PATENT DOCUMENTS

| | | | |
|---|---|---|---|
| 1,882,919 | 10/1932 | Robbins | 359/391 |
| 3,848,963 | 11/1974 | Peck | 359/391 |
| 4,490,025 | 12/1984 | Weber et al. | 359/391 |
| 4,620,776 | 11/1986 | Ima | 359/391 |
| 4,717,246 | 1/1988 | Fehr et al. | 359/391 |
| 4,812,029 | 3/1989 | Onanhian | 359/394 |
| 5,076,680 | 12/1991 | Arjarosumpu | 359/394 |
| 5,249,077 | 9/1993 | Laronga et al. | 359/385 |
| 5,258,163 | 11/1993 | Krause et al. | 422/58 |

*Primary Examiner*—Thong Nguyen
*Attorney, Agent, or Firm*—Foley & Lardner

[57] ABSTRACT

An object holder (7) for thin slides (4) is described, in which the object holder (7) has a baseplate (8) as well as a lower lying supporting surface (9) as a receptacle for the slide (4). Arranged on the baseplate (8) is a spring steel (10) which has a knife edge (11). This knife edge (11) projects beyond the baseplate (8) onto the lower lying supporting surface (9), the slide (4) being fixed via a clamping mechanism between the knife edge (11) and the supporting surface (9).

12 Claims, 4 Drawing Sheets

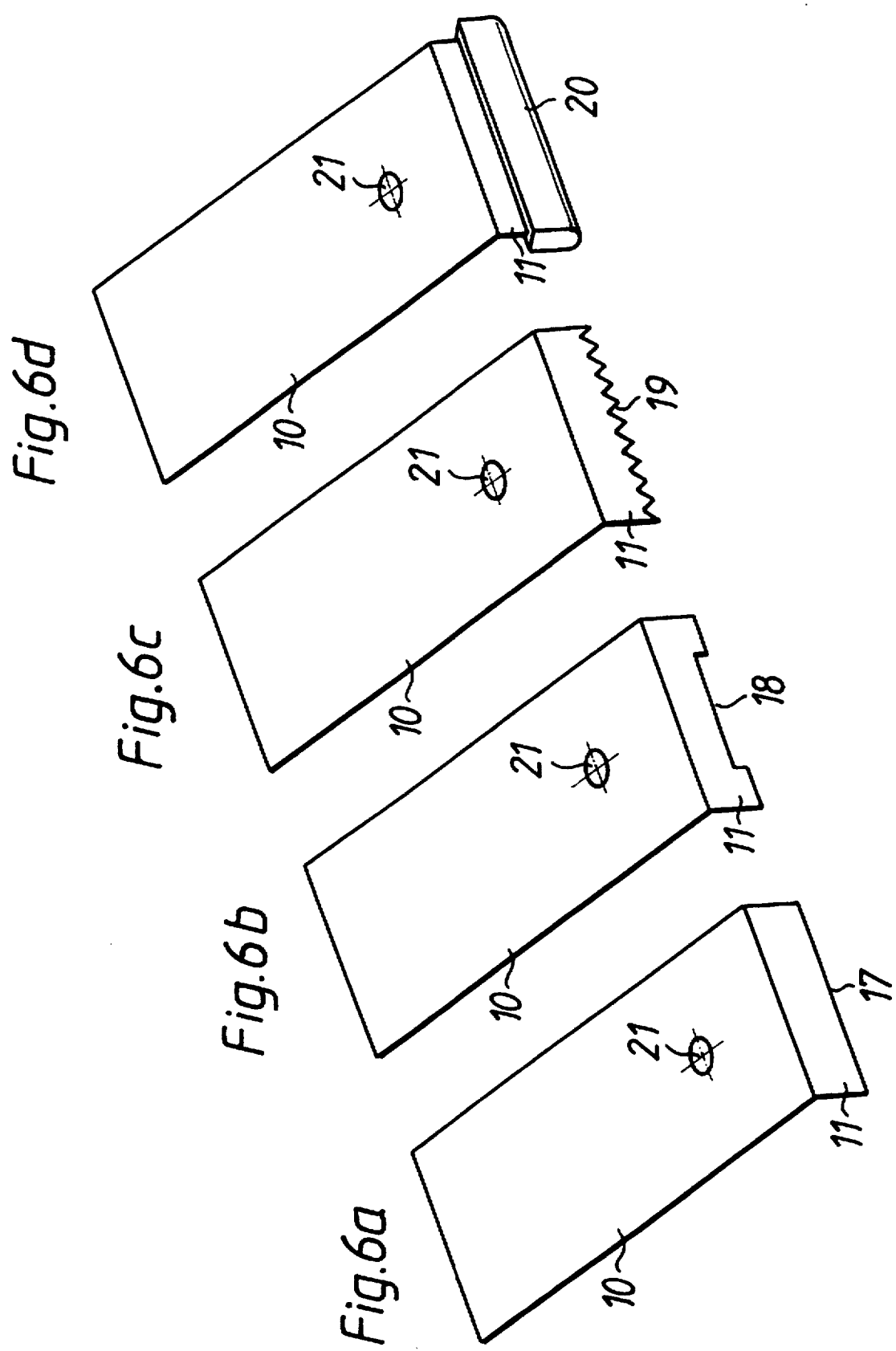

5,781,337

1

OBJECT HOLDER FOR THIN SLIDES

BACKGROUND

The invention relates to an object holder for thin slides.

When a microscope is being used, slides produced from glass are used as support for the various objects to be investigated. The objects are moved under the microscope via the slide or the object holder, in order to bring the various object positions into the optical viewing axis. Special requirements are to be made of the slides when the latter are used in conjunction with the so-called inverse microscopes. In such microscopes, the object to be investigated lies on the slide. The microscope objective is arranged below the slide, with the result that the object is imaged through the slide, which is produced from glass. The optical quality of this image is, of course, largely dependent on the quality of the slide. For this reason, the slides must be produced to be completely transparent and extremely thin. Known slides have a thickness of only approximately 0.17 mm.

It becomes clear from these measures that such slides can no longer be fixed with the conventional object holders. With these holders, it is customary for the slide to be clamped into a frame via its edges and held there.

Since holding via the conventional object holders is excluded, the practice of fixing the thin slide on the microscope stage by means of a modeling clay or the like has been adopted.

However, this type of fixing is very troublesome, particularly when micromanipulators are used, since the space required for working between the condenser arranged above the slide and the slide is limited.

SUMMARY OF THE INVENTION

It is therefore an object of the present invention to provide an object holder of as flat a design as possible and which reliably fixes the known thin slides.

This object is achieved according to the invention by means of the following features. The object holder includes a baseplate (8) as well as a lower lying supporting surface (9) as a receptacle for the slide (4). A spring steel (10) is arranged on the baseplate (8), the spring steel (10) having a knife edge (11), this knife edge (11) projecting beyond the baseplate (8) onto the lower lying supporting surface (9). The slide (4) is fixed via a clamp between the knife edge (11) and the supporting surface (9). Further advantageous developments of the invention are described below.

The thin slides are reliably held as a result of the invention. Owing to the flat design, the space between the slide and the condenser or the objective (depending on microscope type) is advantageously constricted only negligibly for the use of micromanipulators.

BRIEF DESCRIPTION OF THE DRAWINGS

The invention is explained in more detail with reference to exemplary embodiments with the aid of the diagrammatic drawings, in which.

2

Figure 5:
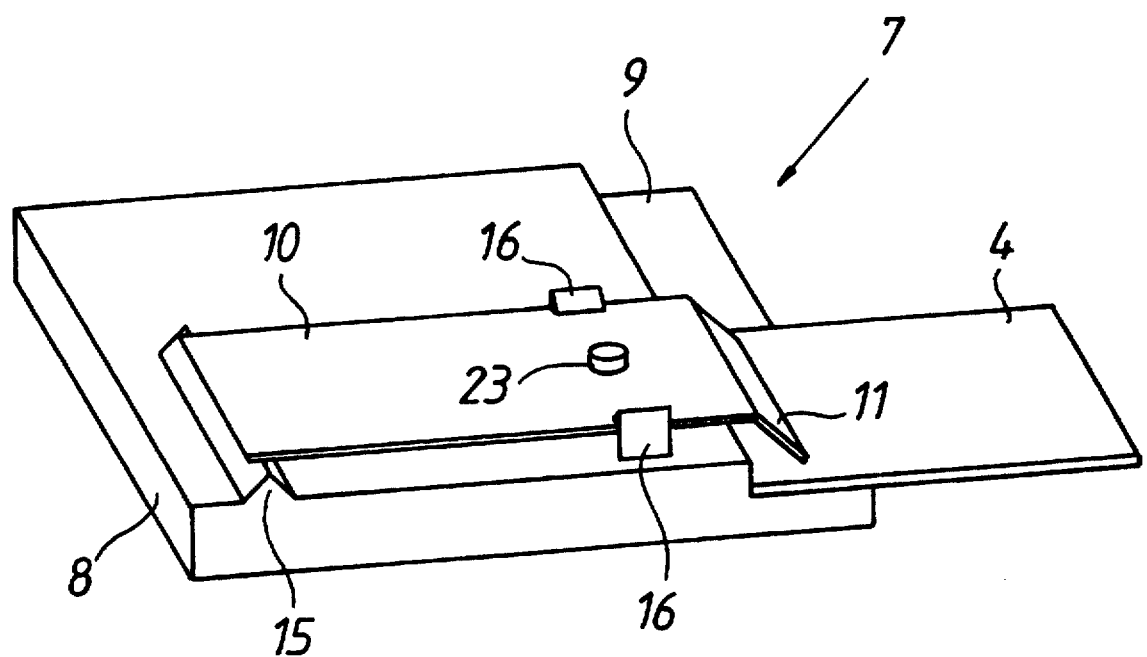

FIG. 5 shows the object holder with a web arranged on the baseplate and two clamps, and FIGS. 6a–6d show four different embodiments of the spring steel.

DESCRIPTION OF EXEMPLARY EMBODIMENTS

Figure 1:
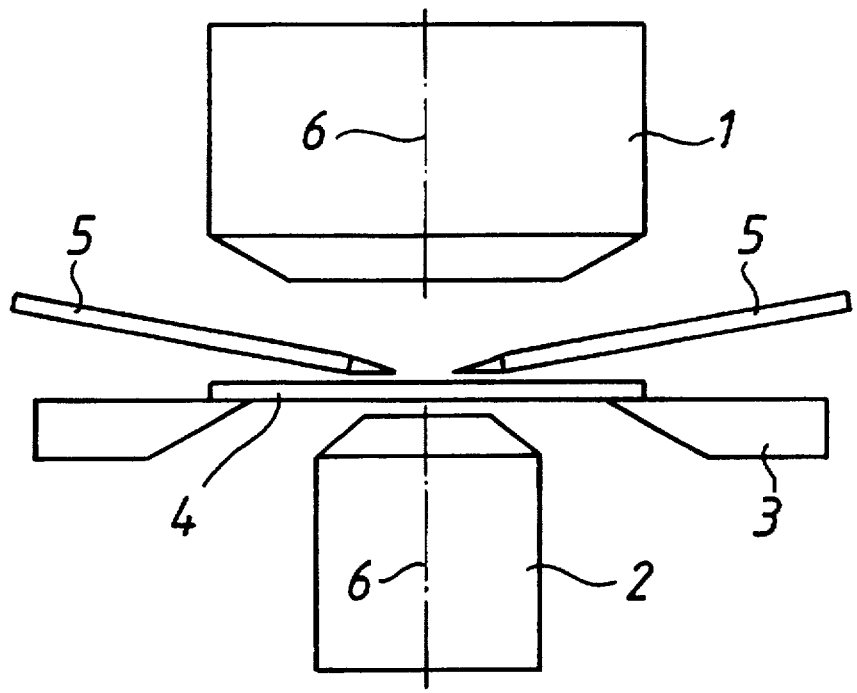
FIG. 1 shows a view of a known object stage in an inverse microscope (prior art)

FIG. 1 (prior art) shows a known design in an inverse microscope, in which the object stage 3 is arranged between a condenser 1 situated thereabove, and a microscope objective 2 situated therebelow, in the optical axis 6 of the microscope. The object stage 3 serves as a support for a slide 4 on which an object (not represented) is arranged. This object is manipulated by means of two micromanipulators 5. It is clear from this representation that the free working distance between the slide 4 and the condenser 1 must be kept as large as possible in order thereby to have available a large working space for the micromanipulators.

Figure 2:
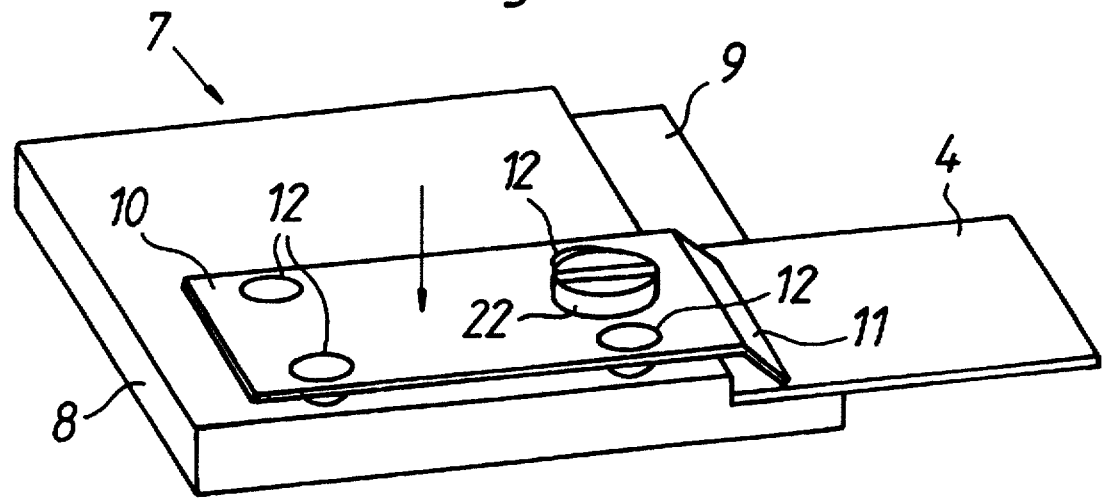
FIG. 2 shows an exemplary embodiment of the object holder according to the invention with cams oriented towards the baseplate.

FIG. 2 shows a view of the object holder 7 according to the invention, having a baseplate 8 and, integrally formed thereon, a lower lying supporting surface 9 for the slide 4. A spring steel 10 is arranged via a clamping screw 22 on the baseplate 8. As spacers, the spring steel 10 has four cams 12 arranged in a rectangle and orientated in the direction of the baseplate 8. Furthermore, there is provided on the spring steel 10 a knife edge 11 which projects beyond the baseplate 8 in the direction of the lower lying supporting surface 9. The knife edge 11 is constructed in an angled fashion in order to clamp the slide 4 on the lower lying supporting surface 9.

The resilient prestressing of the spring steel 10 is achieved via the cams 12 and the clamping screw 22. The slide 4 can be exchanged or orientated simply by exerting finger pressure on the spring steel 10 in the direction of the arrow, resulting in the knife edge 11 being raised from the surface of the slide 4.

For the purpose of use of an inverse microscope, in accordance with FIG. 1 or a conventional microscope, the object holder 7 is arranged on the microscope stage 3 and fixed there, for example, by means of the known retaining clamps for the "normal" slides.

Figure 3:
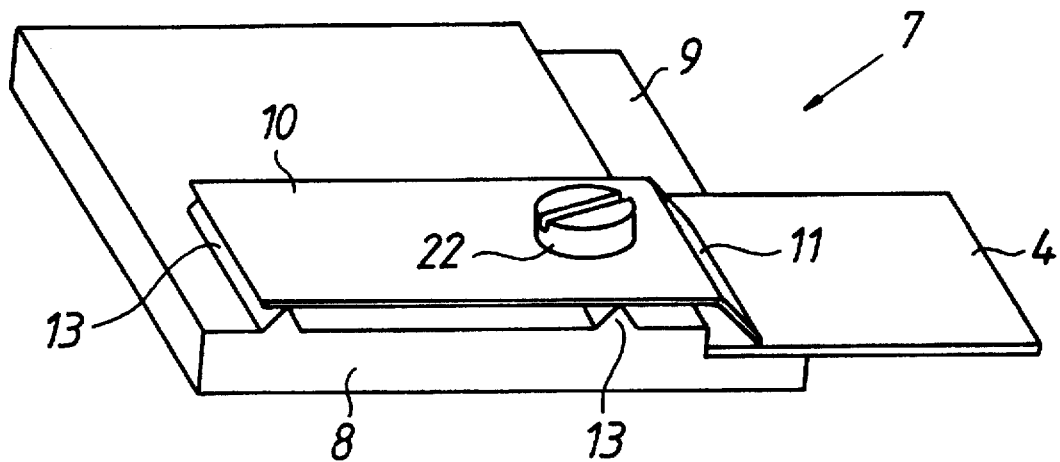
FIG. 3 shows the object holder with two webs arranged on the baseplate.

FIG. 3 shows a further exemplary embodiment of the object holder 7 with two webs 13 arranged parallel to one another on the baseplate 8. The spring steel 10 rests on these webs. Here, as well, the pretensioning of the spring steel 10 is achieved via the clamping screw 22.

Figure 4:
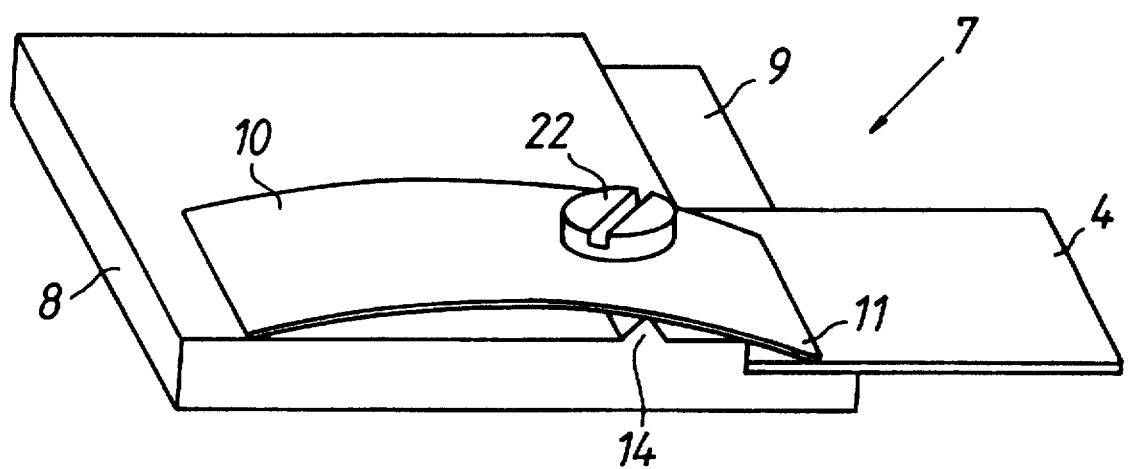
FIG. 4 shows the object holder with one web arranged on the baseplate.

FIG. 4 shows an exemplary embodiment of the object holder 7 with a web 14 which is arranged on the baseplate 8 and on which the spring steel 10 rests. The spring steel 10 is constructed convexly here and is connected to the baseplate 8 via the clamping screw 22.

Represented in FIG. 5 is an exemplary embodiment of the object holder 7 in which the spring steel 10 rests with one end on a web 15 arranged on the baseplate 8. Provided for the purpose of holding and prestressing the spring steel 10 are two clamps 16 which are fastened on the baseplate 8. The spring steel 10 is aligned here via an orientation pin 23.

FIGS. 6a–6d show different embodiments of the spring steel 10 with a bore 21 through which the clamping screw 22 or the orientation pin 23 is guided.

In the exemplary embodiment in accordance with FIG. 6a, the knife edge 11 of the spring steel 10 has a clamping edge 17 of smooth construction.

FIG. 6b shows the knife edge 11 with a central cutout 18 resulting in the slide 4 being clamped only via two supporting points.

In FIG. 6c, the knife edge 11 is provided with teeth 19 so that the slides 4 made from a softer material, for example from plastic, can also be reliably held.

FIG. 6d shows the spring steel 10 with a protector, constructed as a silicone shoe 20, for the knife edge 11 or the slide 4. Of course, it is also possible here to use plastic or rubber as the material.

List of Reference Numerals

1—Microscope condenser
2—Microscope objective
3—Microscope stage
4—Slide
5—Micromanipulator
6—Optical axis
7—Object holder
8—Baseplate
9—Supporting surface
10—Spring steel
11—Knife edge of 10
12—Cams
13—Webs
14—Web
15—Web
16—Clamps
17—Clamping edge
18—Cutout on 11
19—Teeth
20—Silicone shoe
21—Bore in 10
22—Clamping screw
23—Orientation pin

What is claimed is:

1. An object holder (7) for thin slides (4), characterized in that the object holder (7) has a baseplate (8) as well as a lower lying supporting surface (9) as a receptacle for the slide (4), a spring steel (10) is arranged on the baseplate (8), the spring steel (10) having a knife edge (11) and this knife edge (11) projecting beyond the baseplate (8) onto the lower lying supporting surface (9), the slide (4) being fixed via a clamp between the knife edge (11) and the supporting surface (9).

2. An object holder (7) for thin slides (4) according to claim 1, characterized in that the spring steel (10) is fastened in a resiliently prestressed fashion on the baseplate (8) via at least two supporting points.

3. An object holder (7) for thin slides (4) according to claim 1, characterized in that the spring steel (10) has four cams (12) arranged in a rectangle and orientated towards the baseplate (8).

4. An object holder (7) for thin slides (4) according to claim 1, characterized in that the baseplate (8) has two webs (13), arranged parallel to one another, as a support for the spring steel (10).

5. An object holder (7) for thin slides (4) according to claim 1, characterized in that the baseplate (8) has a web (15) as a support for the spring steel (10), and two clamps (16) arranged opposite thereto are provided for holding the spring steel (10).

6. An object holder (7) for thin slides (4) according to claim 1, characterized in that the baseplate (8) has a web (14) as a support for the spring steel (10), and the spring steel (10) is constructed as a convex component.

7. An object holder (7) for thin slides (4) according to claim 1, characterized in that the knife edge (11) is constructed as a continuous clamping edge (17).

8. An object holder (7) for thin slides (4) according to claim 1, characterized in that the knife edge (11) has a cutout (18) in the middle for the purpose of producing a 2-point support of the slide (4).

9. An object holder (7) for thin slides (4) according to claim 1, characterized in that the knife edge (11) has teeth (19).

10. An object holder (7) for thin slides (4) according to claim 1, characterized in that the knife edge (11) is equipped with a material protecting the slide (4).

11. An object holder (7) for thin slides (4) according to claim 10, characterized in that a silicone shoe (20) is provided as the material.

12. An object holder (7) for thin slides (4) according to claim 1, characterized in that the baseplate (8) and the supporting surface (9) are constructed as a single-piece component.

* * * * *